(12) United States Patent
Namiki et al.

(10) Patent No.: US 11,411,879 B2
(45) Date of Patent: Aug. 9, 2022

(54) TRANSMISSION SYSTEM MANAGEMENT DEVICE AND TRANSMISSION SYSTEM DESIGN METHOD

(71) Applicant: Nippon Telegraph and Telephone Corporation, Tokyo (JP)

(72) Inventors: Masatoshi Namiki, Tokyo (JP); Masahiro Yokota, Tokyo (JP); Yuji Minato, Tokyo (JP); Masaaki Inami, Tokyo (JP); Daisaku Shimazaki, Tokyo (JP); Hideki Maeda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 50 days.

(21) Appl. No.: 17/255,131

(22) PCT Filed: Jun. 27, 2019

(86) PCT No.: PCT/JP2019/025556
§ 371 (c)(1),
(2) Date: Dec. 22, 2020

(87) PCT Pub. No.: WO2020/008989
PCT Pub. Date: Jan. 9, 2020

(65) Prior Publication Data
US 2021/0266266 A1    Aug. 26, 2021

(30) Foreign Application Priority Data
Jul. 2, 2018    (JP) .............................. JP2018-125786

(51) Int. Cl.
*H04L 12/841* (2013.01)
*H04L 12/727* (2013.01)
(Continued)

(52) U.S. Cl.
CPC .......... *H04L 47/283* (2013.01); *H04L 45/121* (2013.01)

(58) Field of Classification Search
CPC ............................ H04L 45/121; H04L 47/283
See application file for complete search history.

(56) References Cited

U.S. PATENT DOCUMENTS 6,928,079 B2 *   8/2005   Ono ...................... H04L 49/206
                                                              370/517
7,110,362 B2 *   9/2006   Kato ................... H04L 41/5003
                                                            370/236.1
(Continued)

FOREIGN PATENT DOCUMENTS

JP         2015-226246         12/2015

OTHER PUBLICATIONS

Horiguchi et al., "Practical application of 100 G packet transport system (100 G-PTS)," NTT Technology Journal, Oct. 2014, 26(10):54-57, 9 pages (with English Translation).
(Continued)

*Primary Examiner* — Rasheed Gidado
(74) *Attorney, Agent, or Firm* — Fish & Richardson P.C.

(57) ABSTRACT

A management device of a transmission system includes a new path information input unit, a statistical information collecting unit that collects statistical information of actual traffic from nodes, and an uninterruptible path designing unit that calculates a delay fluctuation in an entire path with respect to a fluctuation for each section of the path, and designs a path in which the calculated delay fluctuation is smaller than a maximum fluctuation amount according to a buffering amount in the reception node as an uninterruptible path, a path information setting unit that updates path information of the path and stores the updated path information in an existing path information storage unit, and sets a bandwidth permitted in a node constituting the path in the
(Continued)

node, and a notification unit that notifies a user of a path that was not designed as the uninterruptible path.

6 Claims, 9 Drawing Sheets

(51) Int. Cl.
*H04L 47/283* (2022.01)
*H04L 45/121* (2022.01)

(56) References Cited

U.S. PATENT DOCUMENTS

| | | | |
|---|---|---|---|
| 8,369,364 B2 * | 2/2013 | Nakata | H04L 45/24 370/536 |
| 8,780,754 B2 * | 7/2014 | Johansson | H04W 36/18 370/252 |
| 9,756,587 B2 * | 9/2017 | Ito | H04L 41/12 |
| 2004/0208162 A1 * | 10/2004 | Bergmann | H04W 40/24 370/351 |

OTHER PUBLICATIONS

Kawasaki et al., "Development of 100Gbit/s High Speed Packet Optical Transport System," IEICE Transactions B, Apr. 2016, J99-B(4):275-282, 17 pages (with English Translation).

\* cited by examiner (a)

| PATH IDENTIFICATION | ROUTE | PATH TYPE | EFFECTIVE BANDWITH | PRIORITY | A | B | C | D | E | F | G | H | I | J | K | L | M | N | O | DELAY FLUCTUATION | DETERMINATION |
|---|---|---|---|---|---|---|---|---|---|---|---|---|---|---|---|---|---|---|---|---|---|
| | | | | | | | | | | | | | | | | | | | | | |

(b)

| PATH IDENTIFICATION | ROUTE | PATH TYPE | EFFECTIVE BANDWITH | PRIORITY | A | B | F | G | H | I | J | L | M | N | DELAY FLUCTUATION | DETERMINATION |
|---|---|---|---|---|---|---|---|---|---|---|---|---|---|---|---|---|
| | | | | | | | | | | | | | | | | |

Fig. 3

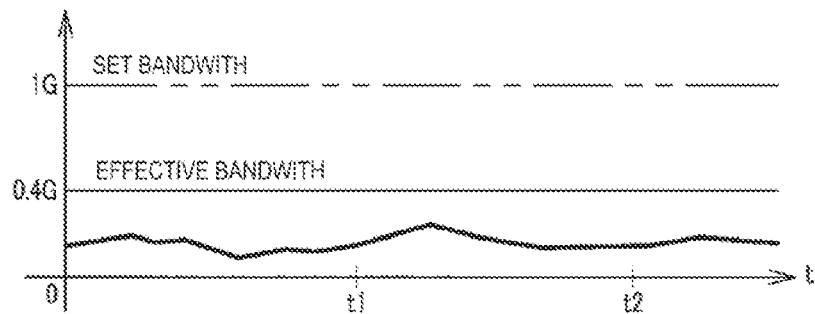
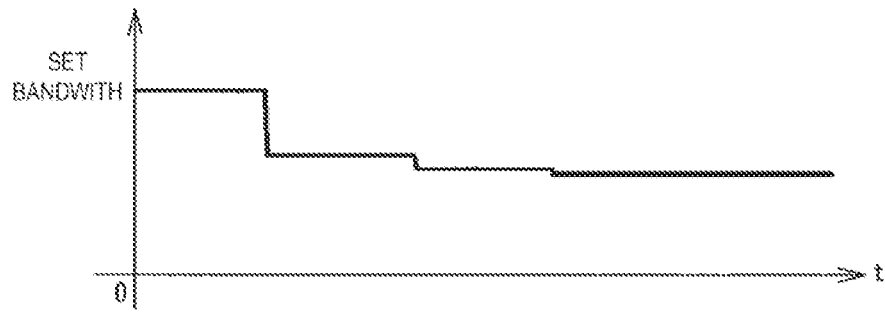
Fig. 4

(a)

| PATH IDENTIFICATION | ROUTE | PATH TYPE | EFFECTIVE BANDWIDTH | PRIORITY | A | B | F | G | H | I | J | L | M | N | DELAY FLUCTUATION | DETERMINATION |
|---|---|---|---|---|---|---|---|---|---|---|---|---|---|---|---|---|
| NEW 1 | F-G-H-I-J | UNINTERRUPTIBLE | 10G (SET) | HIGHEST | 0 | 0 | T1 | T1 | T1 | T1 | T1 | 0 | 0 | 0 | 0 | OK |

(b)

| PATH IDENTIFICATION | ROUTE | PATH TYPE | EFFECTIVE BANDWIDTH | PRIORITY | A | B | F | G | H | I | J | L | M | N | DELAY FLUCTUATION | DETERMINATION |
|---|---|---|---|---|---|---|---|---|---|---|---|---|---|---|---|---|
| EXISTING 1 | F-G-H-I-J | UNINTERRUPTIBLE | 5G | HIGHEST | 0 | 0 | T1 | T1 | T1 | T1 | T1 | 0 | 0 | 0 | T2 | OK |
| NEW 1 | A-F-G-L | UNINTERRUPTIBLE | 20G (SET) | HIGHEST | T2 | 0 | T2 | T2 | 0 | 0 | 0 | T2 | 0 | 0 | T1 | OK |

(c)

| PATH IDENTIFICATION | ROUTE | PATH TYPE | EFFECTIVE BANDWIDTH | PRIORITY | A | B | F | G | H | I | J | L | M | N | DELAY FLUCTUATION | DETERMINATION |
|---|---|---|---|---|---|---|---|---|---|---|---|---|---|---|---|---|
| EXISTING 1 | F-G-H-I-J | UNINTERRUPTIBLE | 4.4G | HIGHEST | 0 | 0 | T1 | T1 | T1 | T1 | T1 | 0 | 0 | 0 | T2+T3×2 | NG |
| EXISTING 2 | A-F-G-L | UNINTERRUPTIBLE | 8G | HIGHEST | T2 | 0 | T2 | T2 | 0 | 0 | 0 | T2 | 0 | 0 | T1 | OK |
| NEW 3 | A-B-G-H-M-N-I-J | UNINTERRUPTIBLE | 30G (SET) | HIGHEST | T3 | T3 | 0 | T3 | T3 | T3 | T3 | 0 | T3 | T3 | T1×2 | OK |

Fig. 7

TRANSMISSION SYSTEM MANAGEMENT DEVICE AND TRANSMISSION SYSTEM DESIGN METHOD

CROSS-REFERENCE TO RELATED APPLICATIONS

This application is a National Stage application under 35 U.S.C. § 371 of International Application No. PCT/JP2019/025556, having an International Filing Date of Jun. 27, 2019, which claims priority to Japanese Application Serial No. 2018-125786, filed on Jul. 2, 2018. The disclosure of the prior application is considered part of the disclosure of this application, and is incorporated in its entirety into this application.

TECHNICAL FIELD

The present invention relates to a transmission system management device and a transmission system designing method, and particularly relates to a management device for a transmission system constituting an uninterruptible path and a transmission system designing method.

BACKGROUND ART

Up to now, a technology for realizing large capacity optical transmission of 100 Gbits/s and flexible and efficient accommodation of IP traffic has been developed (see Non Patent Literature 1 and Non Patent Literature 2). In addition, Non Patent Literature 1 and Non Patent Literature 2 disclose that a label switched path (LSP) can have a redundant configuration for each set section, and interruptible protection can be performed by high-speed switching at 50 ms or less when a failure occurs. In addition, Non Patent Literature 2 discloses that uninterruptible protection for performing switching without a single packet being omitted due to a transmission line failure or a device failure can be achieved by using an overhead of a packet to absorb a delay difference between packets of an active system and a standby system with a buffer inside a device. According to uninterruptible protection, it is possible to secure high reliability without interrupting a communication service. Furthermore, Patent Literature (PTL) 1 discloses a first-come priority uninterruptible switching technique for achieving uninterruptible switching in which an increase in delay is suppressed during a transmission route failure. In this manner, in a network requiring highly reliable communication, a failure uninterruptible technique for achieving uninterruptible operation during a failure, a planned uninterruptible technique for achieving uninterruptible operation during manual switching, and the like are achieved by an uninterruptible path.

FIG. 8 is a configuration diagram schematically illustrating a transmission system of the related art for achieving an uninterruptible path.
The transmission system 101 illustrated in FIG. 8 includes, for example, a transmission node NE1, a reception node NE2, relay nodes NE11 to NE16, and a management device 110. In FIG. 8, the illustration is partially simplified. The transmission system 101 has a redundant route between the transmission node NE1 and the reception node NE2. In FIG. 1, the same reproduced packet is transmitted from the transmission node NE1 to the reception node NE2, but the transmission can be also performed in an opposite direction. Here, the number of hops is, for example, 3. The relay nodes NE11 to NE13 constitute a short route. The relay nodes NE14 to NE16 constitute a long route. Each of the nodes includes a central processing unit (CPU), a switch SW, a plurality of interface boards (hereinafter referred to as IF boards and simply denoted as IFs in the drawings), and the like. The IF board is also referred to as a line card. Meanwhile, a buffer is provided in end point nodes (the transmission node NE1, the reception node NE2), and the two end point nodes include symmetrical components in FIG. 8. The relay node has a different configuration from the end point node. The CPUs and switches SW of the relay nodes NE11 to NE16 are not illustrated in the drawings. A configuration of the relay node on the long route side may be the same as a configuration of the relay node on the short route side.

The relay nodes NE11 to NE13 on the short route are configured to be interrupted by other traffic from above in the drawing than the traffic from the transmission node NE1 to the reception node NE2. For this reason, in the relay node NE11, a delay fluctuation occurs at a junction point when packets input from two different IF boards (line cards) are output from one other IF board (line card). Similarly, also in the relay nodes NE12 and NE13, a delay fluctuation occurs at junction points.

For this reason, the management device 110 of the transmission system 101 adjusts a timing by inserting a delay into the short route of a packet transmitted from the transmission node NE1 to the reception node NE2, thereby achieving uninterruptible switching. The insertion of a delay into the short route means that a fluctuation absorption buffer delay time is set as a fluctuation absorption buffering amount in a buffer of an IF board disposed on a path side passing through the short route in the reception node NE2.

CITATION LIST

Patent Literature

PTL 1: JP 2015-226246A

Non Patent Literature

Non Patent Literature 1: Makoto Horiguchi et "Development of 100-Gbit/s Packet Transport System", NTT Technology Journal, October 2014, Volume 26, No. 10, pp. 54-57.
Non Patent Literature 2: Takeshi Kawasaki et at, "Development of 100 Gbit/s High Speed Packet Optical Transport System", IEICE Transactions B. The Institute of Electronics, Information and Communication Engineers, April 2016, Volume J99-B, No. 4, pp, 275-282.

SUMMARY OF THE INVENTION

Technical Problem

In the related art, variation of delay fluctuations occurring in the relay nodes NE11 to NE13 cannot be supported, and thus designers of transmission systems 101 have used worst-case design, designing the number of hops or a bandwidth capable of accommodating traffic in a path (accommodation bandwidth) based on an allowable maximum of a fluctuation absorption buffering amount (hereinafter referred to as a maximum fluctuation amount). For this reason, an accommodation bandwidth of a path was limited to a low level.

The number of hops and the design of an accommodation bandwidth in the related art will be described with reference to FIG. 9. FIG. 9(a) is a schematic diagram of a path for describing the design of a transmission system that achieves an uninterruptible path of the related art. In FIG. 9(a), ten squares aligned in a row illustrate nodes that can constitute an uninterruptible path in a communication network. Here, it is assumed that a node A is a transmission node, a node J is a reception node, and nodes B to I are relay nodes. It is assumed that a route of a path from the transmission node to the reception node passes through all relay nodes in a horizontal direction in the drawing. In addition, considering interruption of other traffic from below in the drawing, nine paths that can be set for this network are indicated by nine arrows.

This example is on the assumption that the number of hops is a "maximum number of hops" and all relay nodes are "interrupted" as calculation conditions. That is, it is assumed that the number of hops is 8 and the number of interruptions is 8. Specifically, the eight relay nodes B to I are configured to be interrupted by other traffic from below in the drawing. This is because, in the related art, accommodation is limited on the assumption that the number of relay nodes is fixed regardless of accommodation conditions and that traffic interruption occurs in all nodes. Under this assumption, the related art was designed such that a delay fluctuation is set to be equal to or less than a maximum fluctuation amount based on a set bandwidth 901 under the same conditions for all paths. That is, in the related art, a worst-case design is employed based on a bandwidth which is set in advance for each path by a designer (set bandwidth) on the same calculation conditions for all paths.

FIGS. 9(b) to 9(d) are schematic diagrams of paths for describing the design of a transmission system that achieves an uninterruptible path on conditions set for each path. Nine paths illustrated in FIG. 9(b) are on the assumption that the number of hops is eight and the number of interruptions is eight as calculation conditions, similar to the paths illustrated in FIG. 9(a). However, in this case, a delay fluctuation is designed to be equal to or less than a maximum fluctuation amount based on an effective bandwidth 902 in which actual traffic is reflected as conditions for each path, rather than being based on a set bandwidth.

Three paths illustrated in FIG. 9(c) schematically show that a delay fluctuation is designed to be equal to or less than a maximum fluctuation amount based on an effective bandwidth 903 on the assumption that the number of hops is two and the number of interruptions is two as calculation conditions. Meanwhile, here, it is assumed that a node A is a transmission node, a node D is a reception node, and nodes B and C are relay nodes.

Four paths illustrated in FIG. 9(d) schematically show that a delay fluctuation is designed to be equal to or less than a maximum fluctuation amount based on an effective bandwidth 904 on the assumption that the number of hops is eight and the number of interruptions is three as calculation conditions. Meanwhile, the thickness of arrows in FIGS. 9(b) to 9(d) represents a difference in the size of the accommodation bandwidths.

In the related art, with respect to an uninterruptible path, it is not possible to flexibly design a transmission system on conditions for each path as illustrated in FIGS. 9(b) to 9(d). On the other hand, from the perspectives of operability and accommodation efficiency in a highly reliable network, it is desirable to make a design on conditions for each path instead of making a design on the same conditions for all paths.

Consequently, an object of the present invention is to solve the above-described problems and provide a transmission system management device and a transmission system designing method which enable flexible bandwidth designing according to conditions of paths.

Means for Solving the Problem

In order to solve the above-described problems, a first aspect of the present invention is a management device for a transmission system including nodes including a transmission node, a reception node and a relay node, the transmission system having a redundant route constituted by the relay node between the transmission node and the reception node, the management device comprising a new path information input unit configured to receive new path information including at least a route and an accommodation bandwidth of a path as path conditions and store the received new path information in a new path information storage unit, a statistical information collecting unit configured to collect statistical information of actual traffic including at least a bandwidth in use and a packet length from each of the nodes, an uninterruptible path designing unit configured to calculate a delay fluctuation in an entire path with respect to a fluctuation for each section of the path based on the collected statistical information of the actual traffic each time the new path information is received, and design a path in which the calculated delay fluctuation is smaller than a maximum fluctuation amount according to a buffering amount in the reception node as an uninterruptible path, a path information setting unit configured to update path information including at least the accommodation bandwidth of the path designed as the uninterruptible path, and store the updated path information in an existing path information storage unit, and set a bandwidth permitted in a node of the nodes that constitutes the path designed as the uninterruptible path in the node as the path information; and a notification unit notifying a user of a path that was not designed as the uninterruptible path.

In order to solve the above-described problems, a sixth aspect of the present invention is a designing method for a transmission system which is performed by a management device for the transmission system including nodes including a transmission node, a reception node and a relay node, the transmission system having a redundant route constituted by the relay node between the transmission node and the reception node, the designing method comprising collecting statistical information of actual traffic including at least a bandwidth in use and a packet length from each of the nodes, receiving new path information including at least a route and an accommodation bandwidth of a path as path conditions and storing the received new path information in a new path information storage unit, calculating a delay fluctuation in an entire path with respect to a fluctuation for each section of the path based on the collected statistical information of the actual traffic each time the new path information is received, and designing a path in which the calculated delay fluctuation is smaller than a maximum fluctuation amount according to a buffering amount in the reception node as an uninterruptible path, updating path information including at least the accommodation bandwidth of the path designed as the uninterruptible path and storing the updated path information in an existing path information storage unit, and setting a bandwidth permitted in a node of the nodes that constitutes the path in the node as path information; and notifying a user of a path that was not designed as the uninterruptible path.

In this manner, the management device of the transmission system collects statistical information of actual traffic including a bandwidth in use and a packet length from nodes. In addition, the management device can set a path in which the delay fluctuation calculated based on the statistical information of the actual traffic is smaller than the maximum fluctuation amount as an uninterruptible path, and can notify a user of a path that cannot be set. Thus, it is possible to perform flexible bandwidth designing according to conditions of paths in the transmission system.

A second aspect of the present invention is the management device for the transmission system according to the first aspect, wherein the uninterruptible path designing unit includes an effective bandwidth calculation unit configured to calculate an effective bandwidth based on the bandwidth in use which is the collected statistical information of the actual traffic, as information for updating the accommodation bandwidth stored in the new path information storage unit, a delay fluctuation calculation unit configured to calculate a delay fluctuation in the entire path by calculating a delay fluctuation occurring at a junction point when packets input from different line cards are output from one line card in the node and adding up delay fluctuations occurring at junction points, and a setting possibility determination unit configured to determine whether or not the delay fluctuation in the entire path is smaller than the maximum fluctuation amount, determine that a path can be set in a case where the delay fluctuation in the entire path is smaller than the maximum fluctuation amount to design the path as the uninterruptible path, and determine that a path cannot be set in a case where the delay fluctuation in the entire path is equal to or greater than the maximum fluctuation amount to notify the notification unit that a path cannot be set.

In this manner, the management device for the transmission system can calculate an effective bandwidth and a delay fluctuation based on the statistical information of the actual traffic so that the effective bandwidth and the delay fluctuation can be updated.

A third aspect of the present invention is the management device for the transmission system according to the second aspect, wherein the delay fluctuation calculation unit calculates the delay fluctuation in the entire path by calculating a maximum delay fluctuation occurring in a case where packets collide with each other with a maximum packet length at the junction point.

In this manner, the management device for the transmission system can estimate a maximum value of a delay fluctuation and compare the maximum value with the maximum fluctuation amount, and thus it is possible to reliably determine the values with a sufficient margin.

A fourth aspect of the present invention is the management device for the transmission system according to the second aspect, wherein the delay fluctuation calculation unit calculates the delay fluctuation in the entire path by calculating a delay fluctuation occurring at the junction point using a collision occurrence probability based on the bandwidth in use and an average packet length which are the collected statistical information of the actual traffic.

In this manner, the management device for the transmission system estimates a delay fluctuation using a collision occurrence probability based on a use bandwidth and an average packet length, and thus it is possible to compare a delay fluctuation calculated with high accuracy with a maximum fluctuation amount.

A fifth aspect of the present invention is the management device for the transmission system according to any one of second aspect to fourth aspect, wherein the effective bandwidth calculation unit calculates the effective bandwidth by multiplying a maximum value in a predetermined period of the bandwidth in use, which is the collected statistical information of the actual traffic, by a safety factor.

In this manner, the management device for the transmission system can estimate an effective bandwidth with a sufficient margin, and thus it is possible to increase reliability.

Effects of the Invention

According to the present invention, it is possible to perform flexible bandwidth designing according to conditions of paths in a transmission system.

BRIEF DESCRIPTION OF DRAWINGS

FIGS. 3($a$) and 3($b$) are schematic diagrams illustrating a storage structure of path information.

FIGS. 4($a$) and 4($b$) are schematic diagrams illustrating an example of setting of an effective bandwidth.

FIGS. 7($a$) to 7($c$) are schematic diagrams illustrating an example of calculation of a delay fluctuation.

DESCRIPTION OF EMBODIMENTS

Hereinafter, a management device for a transmission system of the present invention will be described in detail with reference to the drawings.

Figure 1:
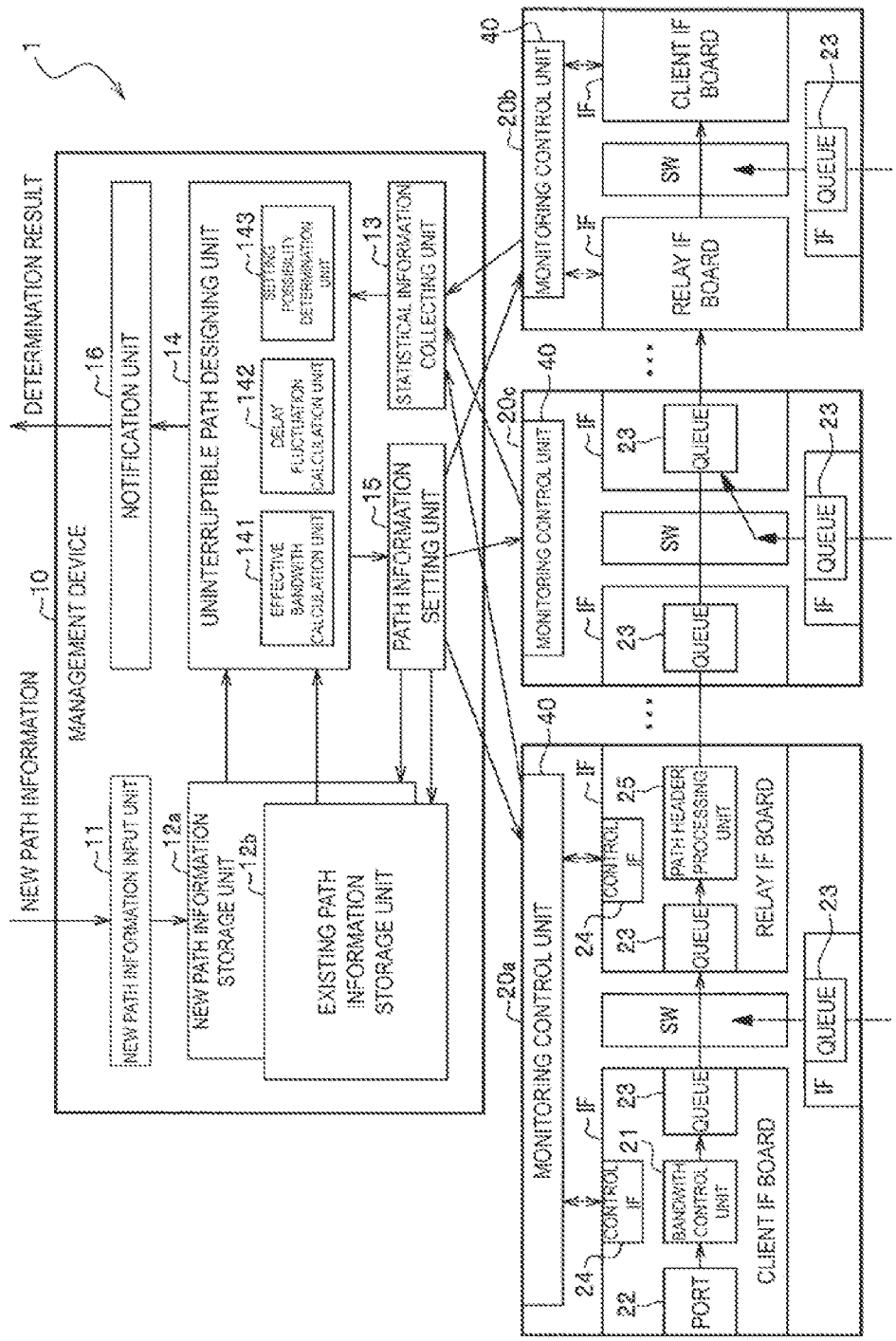
FIG. 1 is a configuration diagram schematically illustrating a management device for a transmission system according to an embodiment of the present invention.

The transmission system 1 illustrated in FIG. 1 is a network that constitutes an uninterruptible path and is a system that transmits a client signal from a client not illustrated in the drawing. The transmission system 1 includes a management device 10 and a plurality of node devices 20 (20$a$, 20$b$, 20$c$, and the like) communicatively connected to the management device 10.

Figure 8:
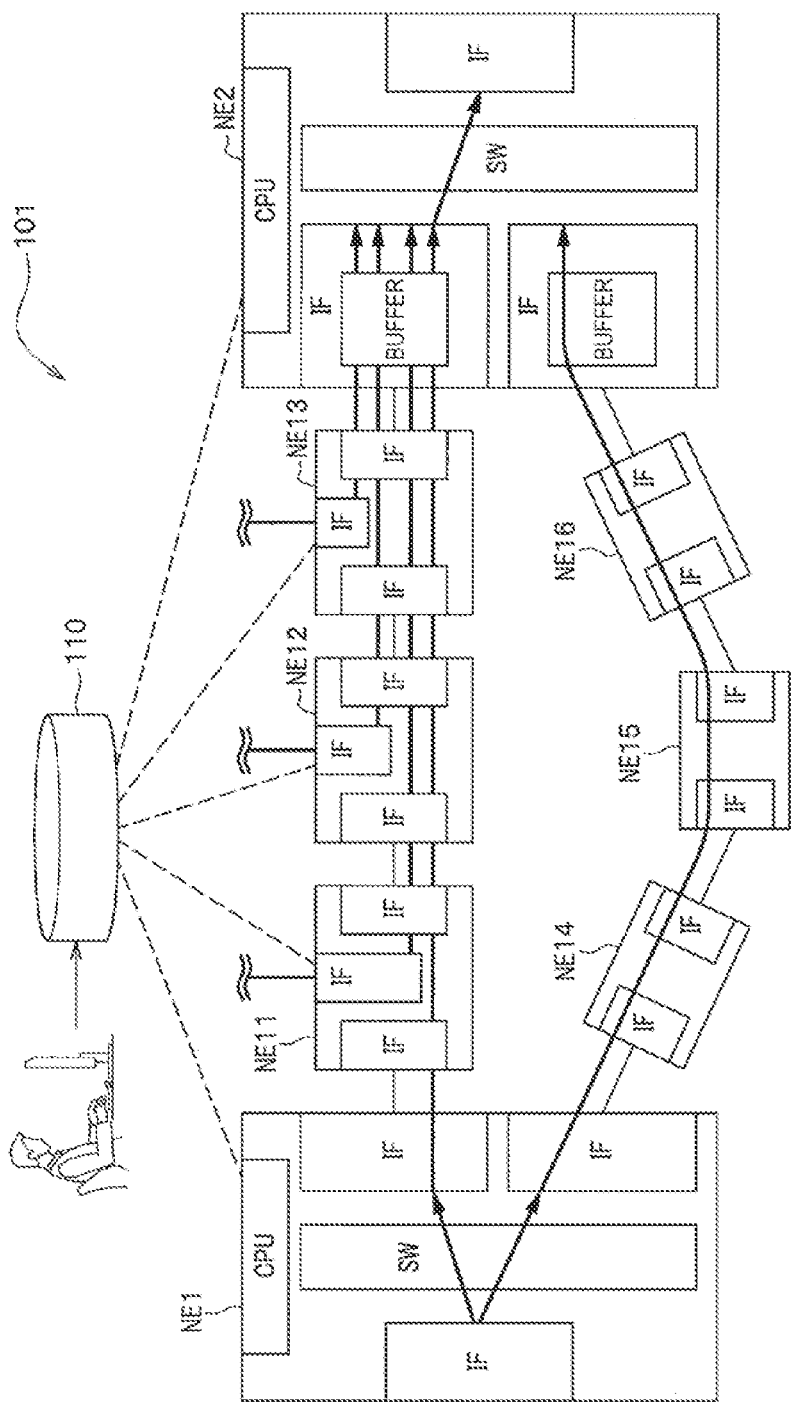
FIG. 8 is a configuration diagram schematically illustrating a transmission system of the related art Which achieves an uninterruptible path.
Figure 9:
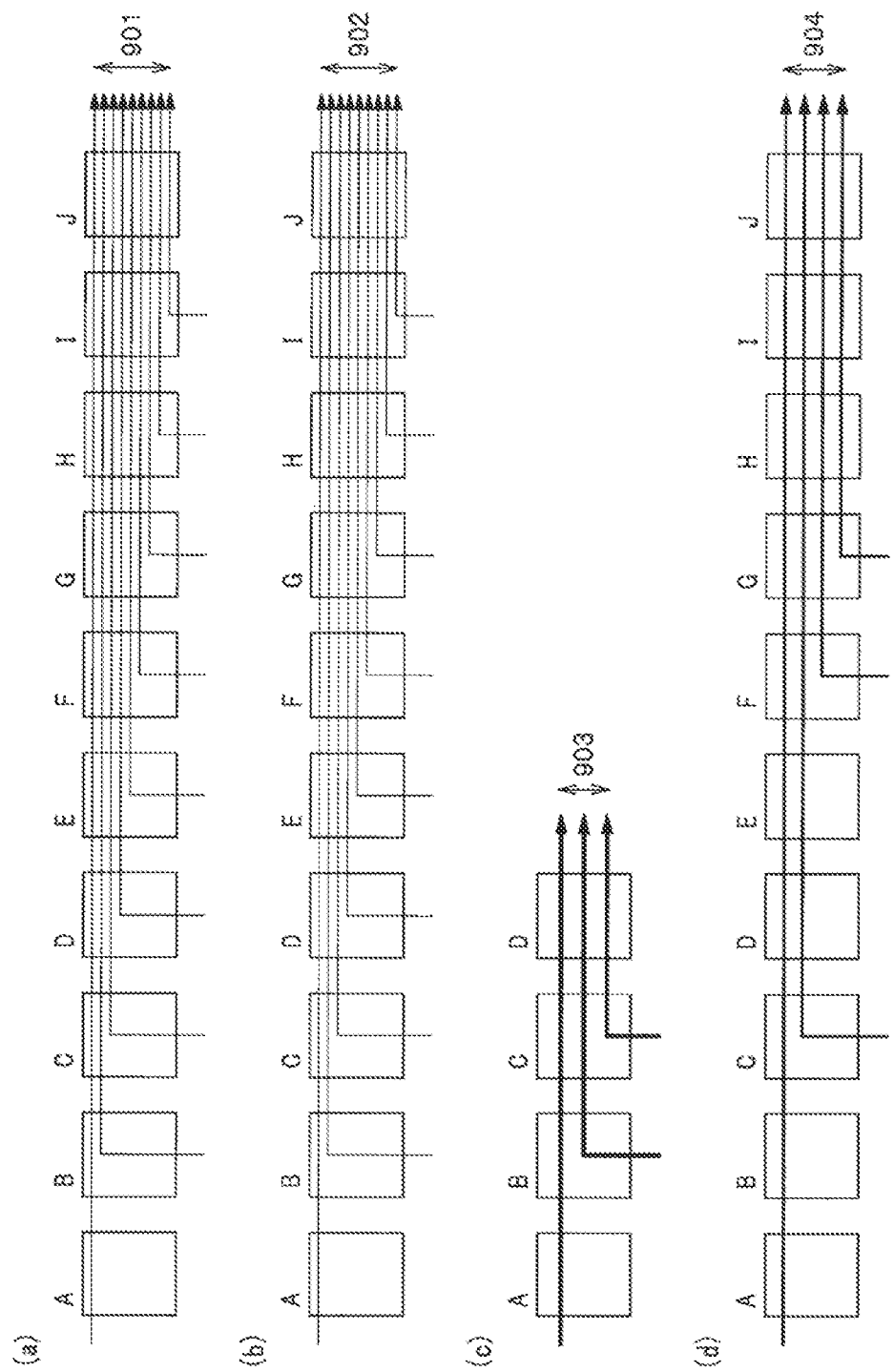
FIGS. 9($a$) to 9($d$) are schematic diagrams of paths.

The transmission system 1 has a redundant route from a transmission node to a reception node, not illustrated in the drawing, and the same reproduced packet is transmitted to the redundant route. FIG. 1 illustrates the node devices 20$a$, 20$b$, and 20$c$. The node device 20$a$ is, for example, a transmission node similar to the transmission node NE1 illustrated in FIG. 8. The node device 20$b$ is, for example, a relay node similar to the relay nodes NE11 to NE13 disposed on the short route in FIG. 8. The node device 20$c$ is, for example, a reception node similar to the reception node NE2 illustrated in FIG. 8. Here, one relay node (the node device 20$c$) is illustrated for simplicity, but the number of relay nodes may be two or more. Hereinafter, the node devices 20$a$, 20$b$, and 20$c$ will be referred to as the node device 20 in cases where the node devices are not distinguished from each other.

The node device 20 includes, for example, a switch SW, an interface board IF, and a CPU that functions as a monitoring control unit 40. The interface board IF (an IF board, a line card) is configured as, for example, a client IF board or a relay IF board.

The client IF board is provided in at least the node devices 20a and 20b which are end points. The client IF board processes client signals which are input and output through a port 22, and includes a bandwidth control unit 21, a queue 23, a control IF 24, and the like. The bandwidth control unit 21 controls the bandwidth of a client signal to transmit a packet within a network bandwidth which is set to be permitted in the node device 20. A fluctuation absorption buffer delay time is set in the queue 23 (buffer) of the client IF board. The control IF 24 is an interface for transmitting and receiving signals between the IF board and the monitoring control unit 40. The relay IF board is provided in all of the node devices 20. The relay IF board includes a path header processing unit 25, the control IF 24, the queue 23, and the like for relaying between the node devices 20. The path header processing unit 25 executes processing such as determining an identifier of an IF board which is an output destination of a packet. Meanwhile, in the interface board IF, only one queue 23 is illustrated in the drawing, but the interface board IF may include queues divided for each priority.

The monitoring control unit 40 monitors traffic information that is to be used as statistical information in the management device 10. Examples of such traffic information include a bandwidth in use for each relay node, a packet length, a priority, and the like. The monitoring control unit 40 acquires information of a bandwidth in use from, for example, the bandwidth control unit 21. The monitoring control unit 40 acquires, for example, packet header information from the path header processing unit 25, and acquires a priority, a packet length, and the like described as the header information.

The node device 20 is a device which includes, for example, a CPU, a memory such as a RAM or a ROM, a network interface card (NIC) for performing communication, and the like and is constituted by an optical cross-connection device, a router, a switch, and the like.

Figure 2:
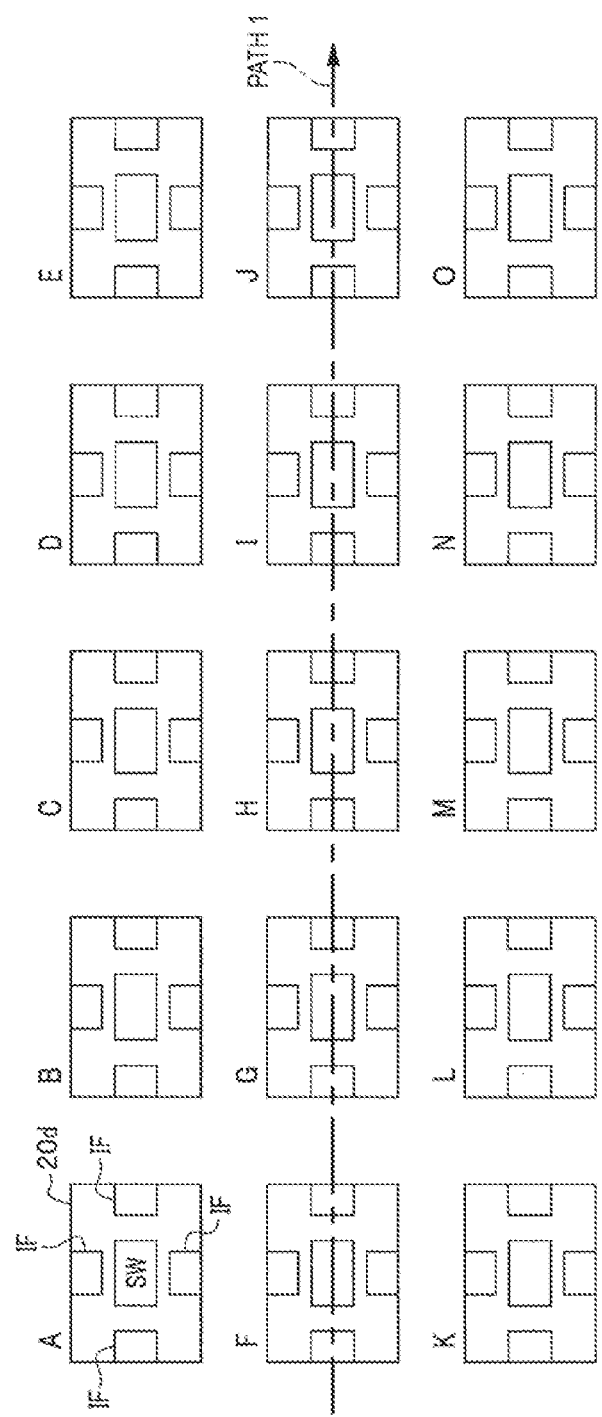
FIG. 2 is a schematic diagram illustrating a configuration example of relay nodes.

Although FIG. 1 illustrates the node devices 20a, 20b, and 20c including three IF boards (line cards), a configuration of the node device 20 is not limited thereto. For example, a configuration of the node device 20 may be a node device 20d including four IF boards (line cards), as illustrated in FIG. 2. The node device 20d includes a switch SW and four IF boards. The number of node devices 20d is not particularly limited, but design using fifteen relay nodes will be described below. The node devices 20d (hereinafter referred to as a node A to a node O) illustrated in FIG. 2 are, for example, relay nodes having the same configuration. Although not illustrated in FIG. 2, the node device 20d includes a CPU that functions as the monitoring control unit 40 (see FIG. 1). Further, in FIG. 2, a route of a path 1 is indicated by an alternating dotted-dashed line as a route of a path to be set. The route of the path 1 is a route that passes a node F, a node (3, a node H, a node I, and a node J in this order. Hereinafter, this route will be simply referred to as F-G-H-I-J.

Referring back to FIG. 1, description of a configuration of the transmission system 1 will continue.

The management device 10 of the transmission system 1 includes a new path information input unit 11, a new path information storage unit 12a, an existing path information storage unit 12b, a statistical information collecting unit 13, an uninterruptible path designing unit 14, a path information setting unit 15, and a notification unit 16. Meanwhile, the management device 10 is connected to a terminal device operated by a user (operator) of the transmission system 1 in a communicative state. The terminal device is, for example, a personal computer or the like, and a user can log in and control the management device 10 from the terminal device.

The statistical information collecting unit 13 collects statistical information of actual traffic from the node devices 20. The collected statistical information of the actual traffic includes at least a bandwidth in use and a packet length. In the present embodiment, the statistical information collecting unit 13 collects traffic information such as a bandwidth in use, a packet length, and a priority for each node device 20. The statistical information collecting unit 13 acquires a priority, a packet length, and the like from the monitoring control unit 40 of the node device 20. The statistical information collecting unit 13 outputs the statistical information collected from the node device 20 to the uninterruptible path designing unit 14.

The packet length may be a current maximum packet length or may be an average packet length.

The new path information input unit 11 is a predetermined input interface or a communication interface. The new path information input unit 11 receives new path information including at least a route and an accommodation bandwidth of a path as path conditions from a terminal device operated by a user of the transmission system 1, and stores the new path information in the new path information storage unit 12a. Path information to be received includes a path route, an accommodation bandwidth, a priority, a type of path, and the like. Here, the accommodation bandwidth is a bandwidth that can be accommodated in a link, and indicates a setting value which is determined in advance in accordance with a path route and the like. The user writes the new path information in the new path information storage unit 12a through the new path information input unit 11 using a predetermined user interface such as a keyboard, a mouse, or a touch panel of the terminal device.

The new path information storage unit 12a stores newly input path information. If new path information is received thereafter, the previous new path information storage unit 12a newly serves as an existing path information storage unit 12b. Further, if the new path information storage unit 12a continuously receives different new path information, a plurality of existing path information storage units 12b are provided, and identification information is imparted to each of the existing path information storage units.

The new path information storage unit 12a is newly created each time new path information is received.

The existing path information storage unit 12b stores existing path information that has already been input before the latest new path information is received, and is configured in a similar manner to the new path information storage unit 12a.

Hereinafter, in a case where the new path information storage unit 12a and the existing path information storage unit 12b are not distinguished from each other, these storage units will be simply referred to as a path information storage unit 12. FIG. 3(a) illustrates an example of a storage structure of path information stored in the path information storage unit 12. For example, as illustrated in FIG. 3(a), the path information storage unit 12 stores information regarding items of path identification, a route, a path type, an effective bandwidth, a priority, fluctuation amounts in relay nodes A to O, a delay fluctuation T in the entire path, and determination.

In FIG. 3(a), the path identification indicates a number or the like for identifying each path. In this example, the path identification includes information for distinguishing new path information from existing path information in addition to a number.

The route is one type of information of path conditions that are input as new path information. As described above, a delay fluctuation occurs due to a collision between packets at a junction point when packets input from two different line cards are output from another line card. The route information is used to identify the location of a collision based on routes in units of line cards.

In FIG. 3(a), the path type is one type of information of path conditions that are input as new path information. The path type includes information for distinguishing uninterruptible (failure uninterruptible), planned uninterruptible, interruptible switching, and the like. Here, "planned uninterruptible" refers to a case where a short route is selected during a normal operation, and uninterruptible switching from a short route to a long route is manually performed in a planned manner when network reconfiguration is performed. Thus, planned uninterruptible is also referred to as short route uninterruptible, as distinguished from failure interruptible. Meanwhile, network reconfiguration indicates that a route such as a user line is transferred due to road construction or construction for electricity, gas, waterworks, or the like.

In FIG. 3(a), the effective bandwidth is information of a bandwidth calculated based on statistical information of actual traffic. Meanwhile, a method of calculating an effective bandwidth will be described later. However, regarding a new path, a setting value (set bandwidth) which is input as new path information is used as an effective bandwidth. The priority is one type of information of path conditions that are input as new path information. The priority includes information for distinguishing, for example, highest, medium, and the like.

In addition, each of the fluctuation amounts in the relay nodes A to O indicates a fluctuation amount imparted from its own path to another path when a collision occurs at a junction point in a case where packets input from different IF boards (line cards) are output from one IF board (line card) in each node. Hereinafter, a fluctuation amount imparted from a path n (where n is an integer) to a path in (where in is an integer) will be denoted as Tn. For example, T1 indicates a fluctuation amount imparted from a path 1 to another path (a path 2 or a path 3). In addition, T2 indicates a fluctuation amount imparted from the path 2 to another path (the path 1 or the path 3). In FIG. 3(a), A to O are identifiers of the node devices 20d illustrated in FIG. 2 and indicate a location where a fluctuation amount is likely to occur. In a specific description to be given below, a path that does not pass through five node devices 20d of C to E, K, and O among fifteen node devices 20d illustrated in FIG. 2 will be described. For this reason, in a specific description of a specific example to be described below, the description will be given using a simple storage structure in which some (C to E, K, and O) of node identifiers are omitted as illustrated in FIG. 3(b), instead of a storage structure illustrated in FIG. 3(a).

In FIG. 3(a), the delay fluctuation T is a total value of fluctuation amounts occurring during collisions at junction points in the entire path. For example, the delay fluctuation T in the entire path for the path 1 indicates a total value of fluctuation amounts obtained by adding all fluctuation amounts, imparted from another path (the path 2 or the path 3) to its own path (T1) during a collision at a junction point with respect to the path 1, to a collision location.

In FIG. 3(a), the determination indicates a result of determination regarding whether or not the delay fluctuation is less than a maximum fluctuation amount Tmax. For example, if the delay fluctuation for the path 1 is less than the maximum fluctuation amount Tmax which is set in advance for the path 1 (T<Tmax), a result of OK is obtained. If the delay fluctuation T is equal to or greater than the maximum fluctuation amount Tmax (T≥Tmax), a result of NG is obtained.

The uninterruptible path designing unit 14 calculates a delay fluctuation in the entire path for a fluctuation for each section of the path based on statistical information of actual traffic which is collected each time new path information is received, and designs a path in which the calculated delay fluctuation is less than a maximum fluctuation amount as an uninterruptible path. Here, the maximum fluctuation amount is a maximum value of a fluctuation absorption buffering amount which is determined in advance in accordance with a buffering amount in a reception node.

The uninterruptible path designing unit 14 includes an effective bandwidth calculation unit 141, a delay fluctuation calculation unit 142, and a setting possibility determination unit 143.

The effective bandwidth calculation unit 141 calculates an effective bandwidth based on a bandwidth in use which is the collected statistical information of actual traffic. The effective bandwidth calculation unit 141 calculates an effective bandwidth for each existing path in consideration of a received new path. The effective bandwidth calculation unit 141 calculates an effective bandwidth based on a bandwidth in use, which is the collected statistical information of actual traffic, as information for updating an accommodation bandwidth (set bandwidth) stored in the new path information storage unit 12a.

The effective bandwidth calculation unit 141 can calculate an effective bandwidth by multiplying, for example, a maximum value in a predetermined period of a bandwidth in use, which is the collected statistical information of actual traffic, by a safety factor. The calculation of an effective bandwidth which is performed by the effective bandwidth calculation unit 141 will be described with reference to FIG. 4(a). In FIG. 4(a), a horizontal axis of a graph represents a time t, and a vertical axis represents actual traffic. The unit of actual traffic is bits per second (bps). In this example, when a new path is first set, a set bandwidth is stored in the new path information storage unit 12a as an initial value of an effective bandwidth. Here, the set bandwidth is, for example, 1 G (bps). The effective bandwidth calculation unit 141 may set, for example, a time t=0 to be a starting time and may set a time t=t1 to be a termination time with respect to a data collecting period for effective bandwidth calculation which is the predetermined period described above. In this case, the effective bandwidth calculation unit 141 can estimate an effective bandwidth by multiplying a maximum bandwidth of statistical information of actual traffic collected in a period from the time t=0 to the time t=t1 by a predetermined safety factor. In this example, an effective bandwidth is 0.4 G [bps], which is significantly reduced as compared to the set bandwidth (1 G [bps]) at the beginning.

In addition, the effective bandwidth calculation unit 141 may respectively set, for example, a time t=t1 and a time t=t2 to be a starting time and a termination time of a data collecting period for effective bandwidth calculation. In this case, the effective bandwidth calculation unit 141 can estimate an effective bandwidth by multiplying a maximum bandwidth of statistical information of actual traffic which is collected in a period from t1 to t2 by a predetermined safety factor. In this example, the effective bandwidth is 0.4 G (bps). In the related art, statistical information of actual traffic is not considered, and thus a set bandwidth is only set in any path regardless of a period. According to the present embodiment, an effective bandwidth is set, and thus it is possible to effectively use bandwidth resources.

In addition, regarding the statistical information of actual traffic, a probability of a traffic amount that exceeds a maximum bandwidth being generated decreases as the overall data collecting period is increased by repeating a data collecting period for effective bandwidth calculation. That is, the accuracy of an effective bandwidth calculated for each data collecting period for effective bandwidth calculation increases. Thus, as illustrated in FIG. 4(b), the effective bandwidth calculation unit 141 can gradually reduce a safety factor as the overall collecting period increases.

In FIG. 4(b), a horizontal axis of a graph represents a time t, and a vertical axis represents an effective bandwidth. As illustrated in FIG. 4(b), when a new path (time t=0) is first set, a predetermined set bandwidth is stored in the new path information storage unit 12a as an initial value of an effective bandwidth. Thereafter, an effective bandwidth is calculated by multiplying a maximum bandwidth in a data collecting period for effective bandwidth calculation by a first safety factor. The effective bandwidth calculated in this step is significantly reduced as compared to a set bandwidth at the beginning, as illustrated in the drawing. Thereafter, an effective bandwidth is calculated by multiplying a maximum bandwidth in a data collecting period for effective bandwidth calculation by a second safety factor which is slightly smaller than the first safety factor. The effective bandwidth calculated in this step is slightly reduced as compared to the previous effective bandwidth as illustrated in the drawing. Further, thereafter, an effective bandwidth is calculated by multiplying a maximum bandwidth in a data collecting period for effective bandwidth calculation by a third safety factor which is slightly smaller than the second safety factor. The effective bandwidth calculated in this step is slightly reduced as compared to the previous effective bandwidth as illustrated in the drawing. Hereinafter, similarly, the effective bandwidth calculation unit 141 can reduce a safety factor. Thereby, it is possible to increase traffic accommodation efficiency.

The delay fluctuation calculation unit 142 calculates a delay fluctuation for a new path and an existing path. The delay fluctuation calculation unit 142 calculates a delay fluctuation T in the entire path by calculating a delay fluctuation occurring at a junction point when packets input from different IF boards (line cards) are output from one IF board (line card) in the node device 20 and adding up delay fluctuations occurring at the respective junction points.

The delay fluctuation calculation unit 142 calculates delay fluctuations occurring at the respective junction points using statistical information of actual traffic which is collected from the node devices 20. In the present embodiment, it is assumed that the delay fluctuation calculation unit 142 calculates, for example, a maximum delay fluctuation, which is a fluctuation occurring in a case where packets collide with each other with a maximum packet length at a junction point, and adds up the fluctuation with respect to a collision location. A method of calculating a maximum delay fluctuation is not particularly limited as long as a maximum delay fluctuation can be calculated. As an example, a fluctuation amount Tn imparted from a path n (where n is an integer) to a path m (where m is an integer) at a junction point may be calculated using the following Equation (1).

[Math. 1]

$$Tn = \text{Maximum packet length/Maximum transmission bandwidth length} \quad \text{Equation (1)}$$

In Equation (1), a maximum packet length indicates, for example, a maximum value within a predetermined period with respect to packet lengths collected as statistical information of actual traffic which is collected from the node devices 20. In addition, the maximum transmission bandwidth length indicates, for example, a maximum value within a predetermined period with respect to collected accommodation bandwidths.

For example, when the path 1 and the path 2 collide with each other at a junction point, a fluctuation amount T1 imparted from the path 1 to the path 2 is expressed by the following Equation (2), and a fluctuation amount T2 imparted from the path 2 to the path 1 is expressed by the following Equation (3).

In addition, when the path 1 and the path 3 collide with each other at a junction point, a fluctuation amount T1 imparted from the path 1 to the path 3 is expressed by the following Equation (2), and a fluctuation amount T3 imparted from the path 3 to the path 1 is expressed by the following Equation (4).

[Math. 2]

$$T1 = \text{Maximum packet length of path 1} \quad \text{Equation (2)}$$

$$T2 = \text{Maximum packet length of path 2} \quad \text{Equation (3)}$$

$$T3 = \text{Maximum packet length of path 3} \quad \text{Equation (4)}$$

In addition, when Tn of Equation (1) is used as a delay fluctuation occurring at a junction point in a method of calculating a maximum delay fluctuation using the above-described Equation (1) or the like, and T is set to be a delay fluctuation in the entire path for a path n, the delay fluctuation T is expressed by the following Equation (5).

[Math. 3]

$$T = \Sigma_{\text{Collision location}} Tn \quad \text{Equation (5)}$$

In Equation (5), the sum of Tn for collision locations means that the number of targets to be added is as many as the number of inputs of background traffic which is joined from another line card. For example, the delay fluctuation in the entire path 1 is a value obtained by adding up fluctuation amounts received by the path 1 from other paths at a junction point. Specifically, in a case where the path 1 and the path 2 are joined together at one location and the path 1 and the path 3 are joined together at two locations, a delay fluctuation T in the entire path 1 is expressed by the following Equation (6). Meanwhile, T2 indicates a fluctuation amount imparted from the path 2 to the path 1, and T3 indicates a fluctuation amount imparted from the path 3 to the path 1.

[Math. 4]

$$T = T2 + T3 \times 2 \quad \text{Equation (6)}$$

With respect to each of a new path and an existing path, the setting possibility determination unit 143 determines whether or not a delay fluctuation T in the entire path is smaller than a maximum fluctuation amount Tmax which is determined for each path. In a case where the delay fluctuation T in the entire path is smaller than the maximum fluctuation amount Tmax, the setting possibility determination unit 143 determines that the path can be set and designs the path as an uninterruptible path. In this case, the setting possibility determination unit 143 notifies the path information setting unit 15 that a path in which a delay fluctuation T is smaller than the maximum fluctuation amount Tmax can be designed as an uninterruptible path ("can be set"). In a case where the delay fluctuation in the entire path is equal to or greater than the maximum fluctuation amount Tmax, the setting possibility determination unit 143 determines that the path cannot be set and notifies the notification unit 16 that the path cannot be set ("cannot be set").

The path information setting unit 15 sets a path designed as an uninterruptible path by the uninterruptible path designing unit 14 in the node devices 20. That is, with respect to a path in which a delay fluctuation for the entire path is smaller than a maximum fluctuation amount, the path information setting unit 15 sets an effective bandwidth stored in the path information storage unit 12 (path information) in the node device 20 as a bandwidth permitted in the node device 20 constituting the path.

When the path information setting unit 15 is notified by the uninterruptible path designing unit 14 that a path can be set as an uninterruptible path, the path information setting unit updates path information for an uninterruptible path of which path information is stored in the existing path information storage unit 12b. Here, the updated path information includes at least an accommodation bandwidth. Specifically, the path information setting unit 15 updates an effective bandwidth recorded in the existing path information storage unit 12b in accordance with a calculation result of the effective bandwidth calculation unit 141. Meanwhile, with respect to an effective bandwidth of a new path, the path information setting unit 15 uses a setting value as the effective bandwidth as it is. The path information setting unit 15 updates a delay fluctuation T that has already been stored in the existing path information storage unit 12b in accordance with a delay fluctuation T calculated for an existing path.

When a new path for which path conditions are stored in the new path information storage unit 12a as path information is designed as an uninterruptible path, the path information setting unit 15 stores a delay fluctuation T calculated for the new path in the new path information storage unit 12a.

The notification unit 16 notifies a user of a path that was not designed as an uninterruptible path by the uninterruptible path designing unit 14. The notification unit 16 transmits information of a path that cannot be set as an uninterruptible path, among path information input by the management device 10, to a terminal device operated by the user of the transmission system 1. In addition, the notification unit 16 also transmits information of a path designed as an uninterruptible path to the terminal device. The user can recognize whether or not a path having desired path conditions can be set as an uninterruptible path by confirming information of a path displayed on, for example, a liquid crystal display or the like of the terminal device.

Meanwhile, the management device 10 includes, for example, an arithmetic device such as a CPU, a storage device such as a memory, and an interface device that transmits and receives various types of information to and from the outside.

Operations Performed by Management Device

Figure 5:
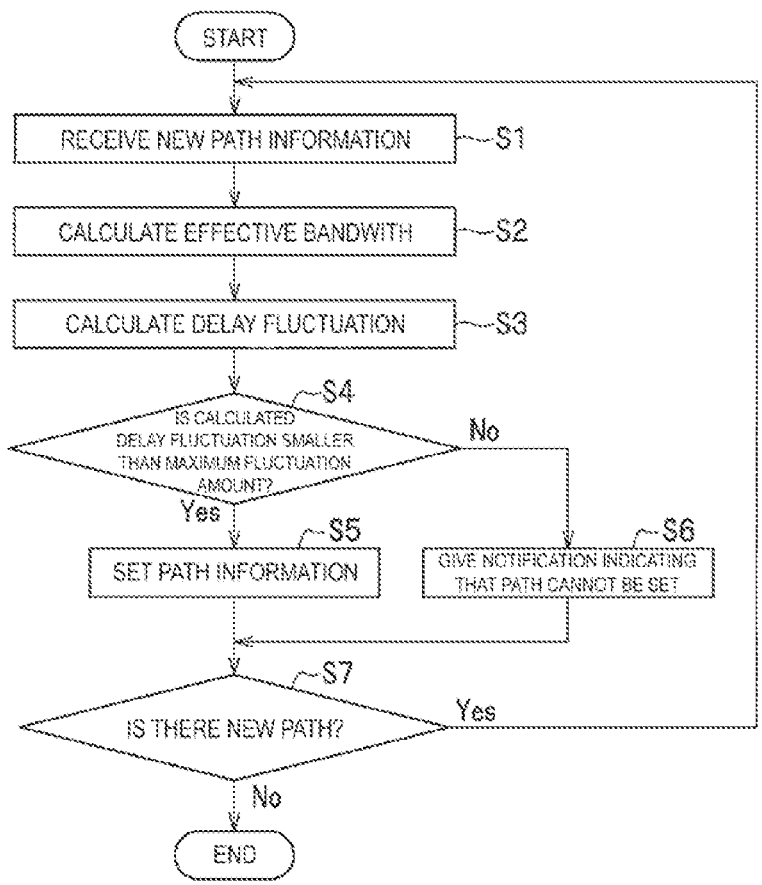
FIG. 5 is a flowchart illustrating processing performed by the management device in FIG. 1.

Operations performed by the management device 10 will be described with reference to FIG. 5 (refer to FIG. 1 where appropriate). FIG. 5 is a flowchart illustrating processing performed by the management device in FIG. 1.

The management device 10 executes a step of collecting statistical information of the actual traffic including at least a bandwidth in use and a packet length from the node devices 20. Under the above assumption, the management device 10 receives new path information including at least a route and an accommodation bandwidth of a path as path conditions by the new path information input unit 11 (step S1). The new path information input unit 11 stores the received new path information in the new path information storage unit 12a.

Each time new path information is received, the effective bandwidth calculation unit 141 calculates effective bandwidths for the respective existing paths based on the collected statistical information of the actual traffic, in consideration of the new path received in step S1 (step S2). In this case, the path information setting unit 15 updates the effective bandwidths recorded in the existing path information storage unit 12b in accordance with calculation results of the effective bandwidth calculation unit 141. Meanwhile, with respect to an effective bandwidth of a new path, the path information setting unit 15 uses a setting value as the effective bandwidth as it is.

In addition, the delay fluctuation calculation unit 142 calculates a delay fluctuation in the entire path for a fluctuation for each section of the path with respect to a new path and an existing path before or after step S2 or in parallel with step S2 (step S3). In this case, the path information setting unit 15 records the delay fluctuation calculated for the new path in the new path information storage unit 12a. In addition, the path information setting unit 15 updates the delay fluctuation recorded in the existing path information storage unit 12b in accordance with the delay fluctuation calculated for the existing path.

Then, with respect to the new path and the existing path, the setting possibility determination unit 143 determines whether or not the calculated delay fluctuation is smaller than a maximum fluctuation amount which is determined for each path (step S4). In step S4, if the delay fluctuation is smaller than the maximum fluctuation amount with respect to the new path (step S4: Yes), the path information setting unit 15 sets, in the node devices, the path information recorded in the new path information storage unit 12a (step S5). Further, if the delay fluctuation is smaller than the maximum fluctuation amount with respect to the existing path (step S4: Yes), the path information setting unit 15 designs the path as an uninterruptible path and sets, in the node devices 20, the path information recorded in the existing path information storage unit 12b as the uninterruptible path (step S5).

On the other hand, in step S4, if the delay fluctuation is equal to or greater than the maximum fluctuation amount with respect to the new path or the existing path (step S4: No), the path information setting unit 15 does not design the path as an uninterruptible path. Alternatively, the notification unit 16 gives a notification indicating that a path that was not designed as an uninterruptible path cannot be set (step S6). Subsequently to step S5 or step S6, if a new path has been input (step S7: Yes), the processing performed by the management device returns to step S1. If no new path has been input (step S7: No), the management device terminates the processing.

Specific Example of Design of Uninterruptible Path

Figure 6:
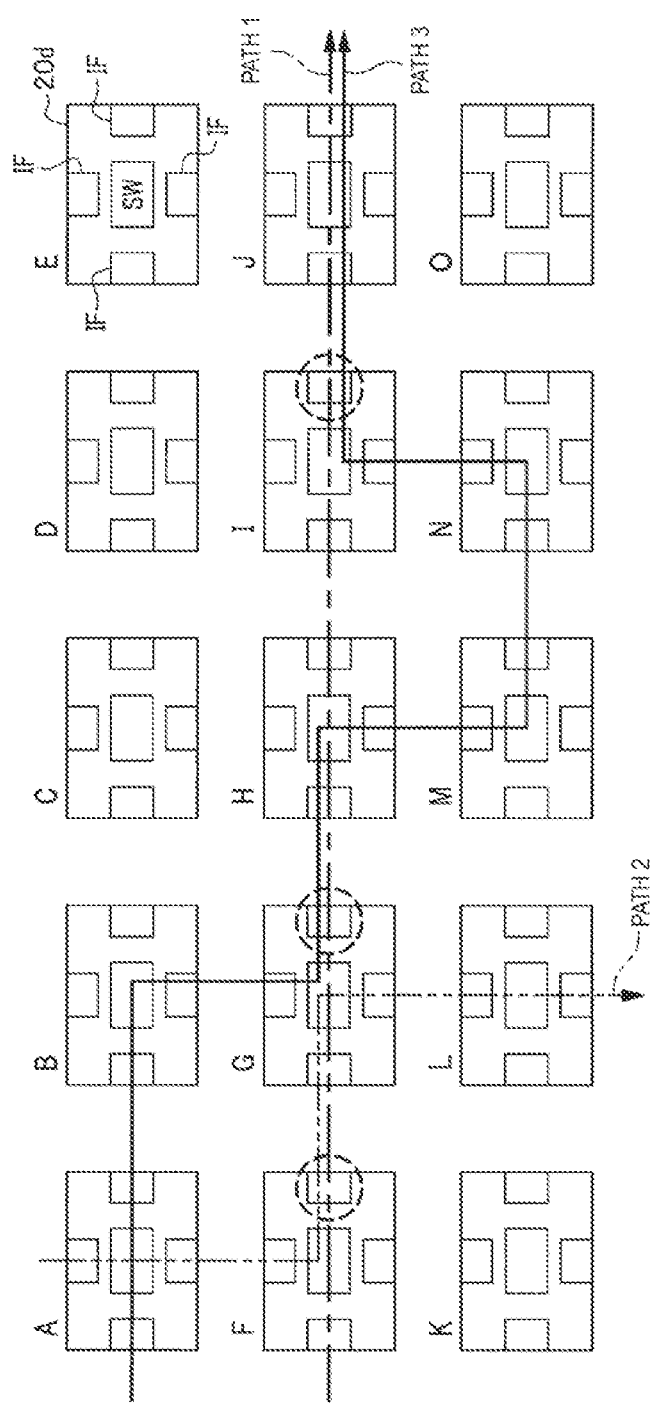
FIG. 6 is a schematic diagram illustrating configuration examples of paths.

Next, a specific example of the design of an uninterruptible path which is made by the management device 100 will be described with reference to FIGS. 6 and 7. First, reference is made to FIG. 6. FIG. 6 is a schematic diagram illustrating configuration examples of paths. The node device illustrated in FIG. 6 is similar to the node device 20d illustrated in FIG. 2. FIG. 6 schematically illustrates paths of the path 2 and the path 3, in addition to the route (alternating dotted-dashed line) of the path 1 illustrated in FIG. 2.

The route of the path 2 is a route that passes through a node A, a node F, a node G, and a node L in this order. Hereinafter, this route will be simply referred to as A-F-G-L. A route of the path 3 is a route that passes through the node A, a node B, the node G, a node H, a node M, a node N, a node I, and a node J in this order. Hereinafter, this path will be simply referred to as A-B-G-H-M-N-I-J.

As illustrated in FIG. 6, both the path 1 and the path 2 pass through the node F. For this reason, in the node F, a delay fluctuation occurs at a junction point (a location indicated by a dashed circle in FIG. 6) when a packet is output from an IF board (hereinafter referred to as a line card).

In addition, as illustrated in FIG. 6, both the path 1 and the path 3 pass through the node G and the node I. For this reason, in the node G and the node I, a delay fluctuation occurs at a junction point (a location indicated by a dashed circle in FIG. 6) when a packet is output from a line card. For example, with respect to a case where the paths 1 to 3 are set, the related art would be designed by determining whether or not a delay fluctuation based on a set bandwidth is equal to or less than a maximum fluctuation amount under the same conditions for all paths. On the other hand, in the present embodiment, reference will be made to FIG. 7 (refer to FIG. 6 where appropriate) to describe that setting can be performed under conditions for each path.

FIG. 7(a) is a diagram schematically illustrating the new path information storage unit 12a in a case where new path information in which a route is "F-G-H-I-J", a path type is "uninterruptible", a set bandwidth is "10 G", and a priority is "highest", is input as path conditions of the path 1 shown in FIG. 6.

An identification number of the path 1 is "1", which is new path information here, and thus the path identification is assumed to be "new 1".

In addition, the information is new path information, and thus a set bandwidth (10 G (set)) is stored in an effective bandwidth of the path 1.

Further, it is assumed that fluctuation amounts in the node F, the node O, the node H, the node I, and the node J constituting a path route are all T1.

In addition, no collision occurs at a junction point at this stage, and thus there is no delay fluctuation occurring in the entire path 1 (T=0). Thus, the delay fluctuation T is naturally smaller than a maximum fluctuation amount Tmax of the path 1 (T<Tmax), and thus an item for determination is set to be OK (can be set as an uninterruptible path).

In FIG. 7(b), data of a path type "existing 1" is similar to data of a path type "new 1" in FIG. 7(a). This means that the new path information storage unit 12a having stored path information of the path 1 in the past has newly become the existing path information storage unit 12b. The data of the path type "existing 1" will be described later.

In FIG. 7(b), data of a path type "new 2" schematically indicates the new path information storage unit 12a in which the new path information of the path 2 illustrated in FIG. 6 is stored. It is assumed that path conditions of the path 2 include a route being "A-F-G-L", a path type being "uninterruptible", a set bandwidth being "20 G", and a priority being "highest". An identification number of the path 2 is "2", which is new path information here, and thus the path identification is assumed to be "new 2". In addition, the information is new path information, and thus a set bandwidth (20 G (set)) is stored in an effective bandwidth of the path 2. Further, it is assumed that fluctuation amounts in the node A, the node F, the node G, and the node L constituting a path route are all T2.

In addition, at this stage, it can be understood that a collision occurs at a junction point of the node F through which the path 1 and the path 2 both pass (a location indicated by a dashed rectangle in FIG. 7(b)). For this reason, a delay fluctuation T in the entire path 2 is a fluctuation amount T1 which is imparted from another path (path 1) to its own path (path 2). In this case, the delay fluctuation T (=T1) is smaller than the maximum fluctuation amount Tmax of the path 2 (T<Tmax), and thus an item for determination is set to be OK (can be set as an uninterruptible path).

On the other hand, in FIG. 7(b), some information in the data of the path type "existing 1" have been updated as compared to the data of the path type "new 1" in FIG. 7(a). With respect to the path 1, an effective bandwidth is calculated by multiplying a maximum bandwidth of statistical information of actual traffic which is collected in a data collecting period for effective bandwidth calculation by a predetermined safety factor. In this example, an effective bandwidth is 5 G [bps], which is significantly reduced as compared to a set bandwidth (10 G [bps]) at the beginning.

In addition, at this stage, it can be understood that a collision occurs at a junction point of the node F through which the path 1 and the path 2 both pass (a location indicated by a dashed rectangle in FIG. 7(b)). For this reason, a delay fluctuation T in the entire path 1 is a fluctuation amount T2 which is imparted from another path (path 2) to its own path (path 1). In this case, the delay fluctuation T (=T2) is smaller than the maximum fluctuation amount Tmax of the path 1 (T<Tmax), and thus an item for determination is set to be OK (can be set as an uninterruptible path).

In FIG. 7(c), data of a path type "existing 2" is similar to the data of the path type "new 2" in FIG. 7(b). This means that the new path information storage unit 12a having stored path information of the path 2 in the past has newly become the existing path information storage unit 12b. The data of the path type "existing 2" and the data of the path type "existing 1" will be described later.

In FIG. 7(c), data of a path type "new 3" schematically indicates the new path information storage unit 12a in which the new path information of the path 3 illustrated in FIG. 6 is stored. It is assumed that path conditions of the path 3 include a route being "A-B-G-H-M-N-I-J", a path type being "uninterruptible", a set bandwidth being "30 G", and a priority being "highest". An identification number of the path 3 is "3", which is new path information, and thus the path identification thereof is assumed to be "new 3". In addition, the information is new path information, and thus a set bandwidth (30 G (set)) is stored in an effective bandwidth of the path 3. Further, it is assumed that fluctuation amounts in the node A, the node B, the node G, the node H, the node M, the node N, the node I, and the node J constituting a path route are all T3.

In addition, at this stage, with respect to the path 3, it can be understood that a collision occurs at junction points of the node G and the node I through which the path 3 and the path 1 both pass (a location indicated by a dashed rectangle added to FIG. 7(c)). For this reason, a delay fluctuation T in the entire path 3 is an added-up value (T1×2) related to a collision location for a fluctuation amount T1 imparted from another path (path 1) to its own path (path 3). In this case, the delay fluctuation T (=T1×2) is smaller than the maximum fluctuation amount Tmax of the path 3 (T<Tmax), and thus an item for determination is set to be OK (can be set as an uninterruptible path).

Further, in FIG. 7(*c*), some information in the data of the path type "existing 2" have been updated as compared to the data of the path type "new 2" in FIG. 7(*b*). With respect to the path 2, an effective bandwidth is calculated by multiplying a maximum bandwidth of statistical information of actual traffic which is collected in a data collecting period for effective bandwidth calculation by a predetermined safety factor. In this example, an effective bandwidth is 8 G [bps], Which is significantly reduced as compared to a set bandwidth (20 G [bps]) at the beginning. Meanwhile, a delay fluctuation T in the entire path does not change with respect to the path 2, and an item for determination is set to be OK (can be set as an uninterruptible path).

Further, in FIG. 7(*c*), some information in the data of the path type "existing 1" have been updated as compared to the data of the path type "existing 1" in FIG. 7(*b*). In this example, with respect to the path 1, a newly calculated effective bandwidth is 4.4 G [bps], which is reduced as compared to the previous effective bandwidth (5 G [bps]). In addition, at this stage, with respect to the path 1, a collision also occurs at junction points of the node G and the node I through which the path 1 and the path 3 both pass, in addition to a collision at a junction point of the node F through which the path 1 and the path 2 both pass. For this reason, a delay fluctuation T in the entire path 1 is the sum of a fluctuation amount T2 imparted from another path (path 2) to its own path (path 1) and an added-up value (T3×2) related to a collision location for a fluctuation amount T3 imparted from another path (path 3) to its own path (path 1). In this case, the delay fluctuation T (=T2+T3×2) is equal to or greater than the maximum fluctuation amount Tmax of the path 1 (T≥Tmax), and thus an item for determination is set to be NG (cannot be set as an uninterruptible path).

According to the management device of the present embodiment, it is possible to effectively use a bandwidth in an uninterruptible path by performing flexible bandwidth designing based on an effective bandwidth calculated from statistical information of actual traffic. On the other hand, in the related art, a designer performs setting based on worst-case conditions, and thus it is difficult to perform flexible bandwidth designing, which leads to a decrease in accommodation efficiency. On the other hand, according to the present embodiment, operability and traffic accommodation efficiency in a highly reliable network are improved. In addition, according to the present embodiment, with respect to the designing of a planned uninterruptible path, it is sufficient as long as a delay fluctuation in the entire path is equal to or less than a maximum fluctuation amount only during manual switching. Thus, it is possible to obtain a great effect (multiple effect) of not causing the insufficiency of bandwidths even when a design is made with fewer bandwidths for a large number of clients to communicate with each other at a maximum transmission rate at the same time.

Furthermore, according to the present embodiment, when an uninterruptible path is designed, it is possible to increase the number of bandwidths in which traffic can be accommodated or increase the number of relay nodes with respect to a path having a small number of relay nodes for relaying between a transmission node and a reception node or a path having a small number of interruptions in a relay node. Thus, it is possible to further increase the reliability of a network.

Although embodiments of the present invention have been described, the present invention is not limited thereto and can be implemented without departing from the scope of the present invention. For example, description has been given on the assumption that the delay fluctuation calculation unit 142 calculates a delay fluctuation occurring at a junction point using a maximum packet length among the packet lengths collected as statistical information, but this is not limiting. For example, a fluctuation may be calculated using a maximum packet length in design. For example, in the case of a device that can pass 64 bytes to 9000 bytes including a jumbo frame, a maximum packet length in design is 9000 bytes. On the other hand, for using a packet length in statistical information, if a device can pass only a packet length from 64 bytes to 1000 bytes, 1000 bytes can be used as a maximum packet length among collected statistical information (a packet length used by a user is 64 bytes to 1000 bytes).

Further, in order to increase accommodation efficiency, a fluctuation may be calculated using an average packet length based on statistical information instead of a maximum packet length. For example, when it is assumed that an average packet length is 300 bytes in a network in which there is rarely a packet of 1000 bytes, accommodation efficiency can be further increased.

In addition, description has been given on the assumption that the delay fluctuation calculation unit 142 calculates a delay fluctuation occurring at a junction point using a maximum accommodation bandwidth among information collected as statistical information together with the maximum packet length at the time of calculating, but a maximum bandwidth in design or an average bandwidth based on the statistical information may be used instead of a maximum bandwidth based on the statistical information.

Further, for example, the delay fluctuation calculation unit 142 may calculate a delay fluctuation occurring at a junction point using a collision occurrence probability based on a bandwidth in use and an average packet length which are collected statistical information of actual traffic. A method of calculating the collision occurrence probability is not particularly limited as long as the collision occurrence probability can be calculated. As an example, a fluctuation amount T'n imparted from a path n (where n is an integer) to a path in (where m is an integer) at a junction point may be calculated using the following Equation (7).

[Math. 5]

$$T'n = Ts \times \rho/(1-\rho) \quad \text{Equation (7)}$$

Where $$Ts = \text{(Average service time)} = \text{(Average packet length based on statistical information)}/10^{13} \quad \text{Equation (8)}$$

$$\rho = \text{Load factor} = \text{(Sum of effective bandwidths)}/\text{(Maximum bandwidth)} \quad \text{Equation (9)}$$

An average service time in the first term on the right side of Equation (8) indicates a time until an input packet is output when a packet is transmitted at a predetermined rate. For example, when a packet is transmitted at a rate of 100 Gbps, a packet of 1000 bytes is input, and an average service time until the packet is output is $1000 \times 8 \times 10^{-11}$ seconds or the like.

An average packet length which is a numerator of a second term on the right side of Equation (8) indicates an average value within a predetermined period with respect to a packet length collected as statistical information of actual traffic which is collected from the node device 20 at a junction point. $10^{11}$ which is a denominator of the second term on the right side of Equation (8) indicates $10^{11}$ [bps]. In addition, a maximum bandwidth which is a denominator on the rightmost side of Equation (9) indicates a maximum accommodation bandwidth collected as statistical information. Meanwhile, a maximum bandwidth in design or an average bandwidth based on statistical information may be used instead of a maximum bandwidth based on the statistical information.

The sum of effective bandwidths which is a numerator on the rightmost side of Equation (9) is the sum of effective bandwidths of respective paths that are joined at junction points. In the example of FIG. 7(c), the sum is 4.4 G+8 G+30 G.

An average service time is introduced as shown in Equation (7), so that it is possible to reflect that waiting time for the average service time occurs in another path joining a predetermined path, and this leads to a fluctuation. In addition, by multiplying the average service time by a load factor, it is possible to estimate an effective value that supports a delay fluctuation occurring due to an actual collision.

Further, when T'n in Equation (7) is used as a delay fluctuation occurring at a junction point in a method of calculating a collision occurrence probability using the above-described Equation (7) or the like, and T is set to be a delay fluctuation in the entire path for a path n, the delay fluctuation T is expressed by the following Equation (10). Meanwhile, in Equation (10), the sum of T'n for collision locations means that the number of targets to be added is as many as the number of inputs of background traffic which is joined from another line card.

[Math. 6]

$$T = \Sigma_{Collision\ location} T'n \quad \text{Equation (10)}$$

Further, in the above-described embodiments, the notification unit 16 notifies a user that a path cannot be designed as an uninterruptible path under path conditions received from the outside as path information ("cannot be set"), and may additionally have an optional function of giving a notification of other information.

Examples of other information may include a maximum accommodable bandwidth. Thereby, the user can recognize that the reason why a path attempted to be designed as an uninterruptible path cannot be set is due to the insufficiency of bandwidths.

In addition, the management device 10 may further include a function of searching for a path that does not cause the insufficiency of bandwidths in a path different from a path route input as a path condition in a case where the insufficiency of bandwidths occurs in a path attempted to be designed by the user as an uninterruptible path. In this case, examples of other information notified of by the notification unit 16 using an optional function may include information of another recommended route. This enables the user to set an uninterruptible path in a case where another recommended route is received.

REFERENCE SIGNS LIST

1 Transmission system
10 Management device
11 New path information input unit
12a New path information storage unit
12b Existing path information storage unit
13 Statistical information collecting unit
14 Uninterruptible path designing unit
141 Effective bandwidth calculation unit
142 Delay fluctuation calculation unit
143 Setting possibility determination unit
15 Path information setting unit
16 Notification unit
20 (20a, 20b, 20c, 20d) Node device
40 Monitoring control unit

The invention claimed is:

1. A management device for a transmission system comprising nodes including a transmission node, a reception node and a relay node, the transmission system having a redundant route constituted by the relay node between the transmission node and the reception node, the management device comprising:
a new path information input unit configured to receive new path information including at least a route and an accommodation bandwidth of a path as path conditions and store the received new path information in a new path information storage unit;
a statistical information collecting unit configured to collect statistical information of actual traffic including at least a bandwidth in use and a packet length from each of the nodes;
an uninterruptible path designing unit configured to calculate a delay fluctuation in an entire path with respect to a fluctuation for each section of the path based on the collected statistical information of the actual traffic each time the new path information is received, and design a path in which the calculated delay fluctuation is smaller than a maximum fluctuation amount according to a buffering amount in the reception node as an uninterruptible path;
a path information setting unit configured to update path information including at least the accommodation bandwidth of the path designed as the uninterruptible path, and store the updated path information in an existing path information storage unit, and set a bandwidth permitted in a node of the nodes that constitutes the path designed as the uninterruptible path in the node as the path information; and
a notification unit notifying a user of a path that was not designed as the uninterruptible path.

2. The management device for the transmission system according to claim 1, wherein the uninterruptible path designing unit comprises:
an effective bandwidth calculation unit configured to calculate an effective bandwidth based on the bandwidth in use which is the collected statistical information of the actual traffic, as information for updating the accommodation bandwidth stored in the new path information storage unit;
a delay fluctuation calculation unit configured to calculate a delay fluctuation in the entire path by calculating a delay fluctuation occurring at a junction point when packets input from different line cards are output from one line card in the node and adding up delay fluctuations occurring at junction points; and
a setting possibility determination unit configured to:
determine whether or not the delay fluctuation in the entire path is smaller than the maximum fluctuation amount;
determine that a path can be set in a case where the delay fluctuation in the entire path is smaller than the maximum fluctuation amount to design the path as the uninterruptible path; and
determine that a path cannot be set in a case where the delay fluctuation in the entire path is equal to or greater than the maximum fluctuation amount to notify the notification unit that a path cannot be set.

3. The management device for the transmission system according to claim 2, wherein the delay fluctuation calculation unit calculates the delay fluctuation in the entire path by calculating a maximum delay fluctuation occurring in a case where packets collide with each other with a maximum packet length at the junction point.

4. The management device for the transmission system according to claim 2, wherein the delay fluctuation calculation unit calculates the delay fluctuation in the entire path by calculating a delay fluctuation occurring at the junction point using a collision occurrence probability based on the bandwidth in use and an average packet length which are the collected statistical information of the actual traffic.

5. The management device for the transmission system according to claim 2, wherein the effective bandwidth calculation unit calculates the effective bandwidth by multiplying a maximum value in a predetermined period of the bandwidth in use, which is the collected statistical information of the actual traffic, by a safety factor.

6. A designing method for a transmission system which is performed by a management device for the transmission system and comprising nodes including a transmission node, a reception node and a relay node, the transmission system having a redundant route constituted by the relay node between the transmission node and the reception node, the designing method comprising:

collecting statistical information of actual traffic including at least a bandwidth in use and a packet length from each of the nodes;

receiving new path information including at least a route and an accommodation bandwidth of a path as path conditions and storing the received new path information in a new path information storage unit;

calculating a delay fluctuation in an entire path with respect to a fluctuation for each section of the path based on the collected statistical information of the actual traffic each time the new path information is received, and designing a path in which the calculated delay fluctuation is smaller than a maximum fluctuation amount according to a buffering amount in the reception node as an uninterruptible path;

updating path information including at least the accommodation bandwidth of the path designed as the uninterruptible path and storing the updated path information in an existing path information storage unit, and setting a bandwidth permitted in a node of the nodes that constitutes the path in the node as path information; and notifying a user of a path that was not designed as the uninterruptible path.

* * * * *